Figure 6:
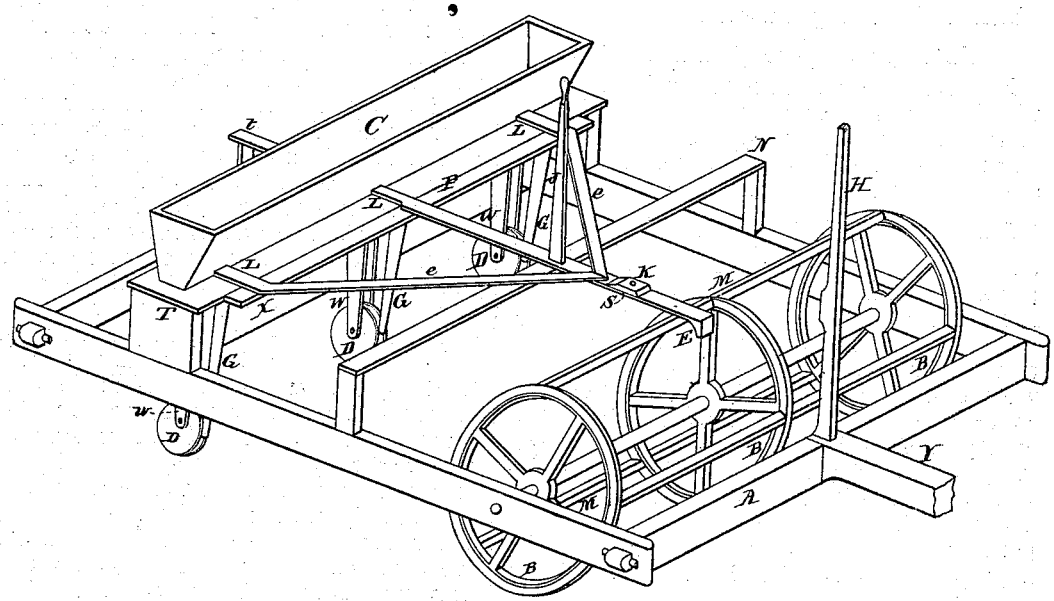

2 Sheets--Sheet 1.
T. C. WILLIAMS.
Improvement in Corn-Planters.
No. 129,446.   Patented July 16, 1872.
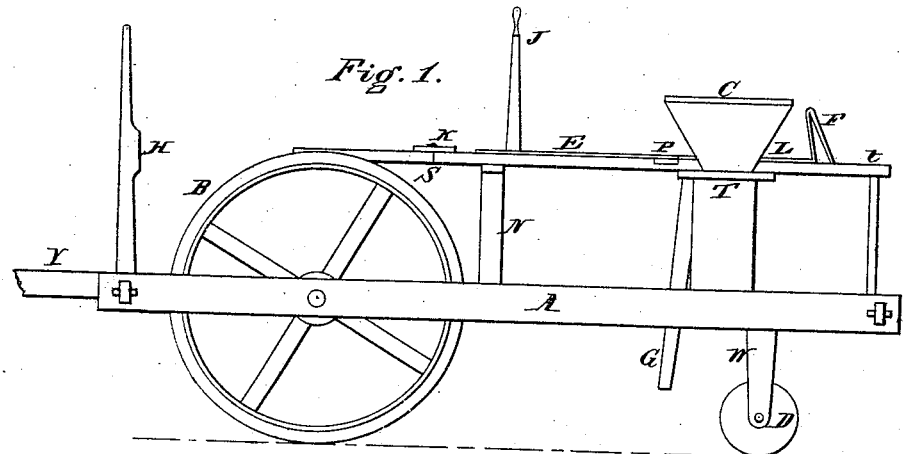
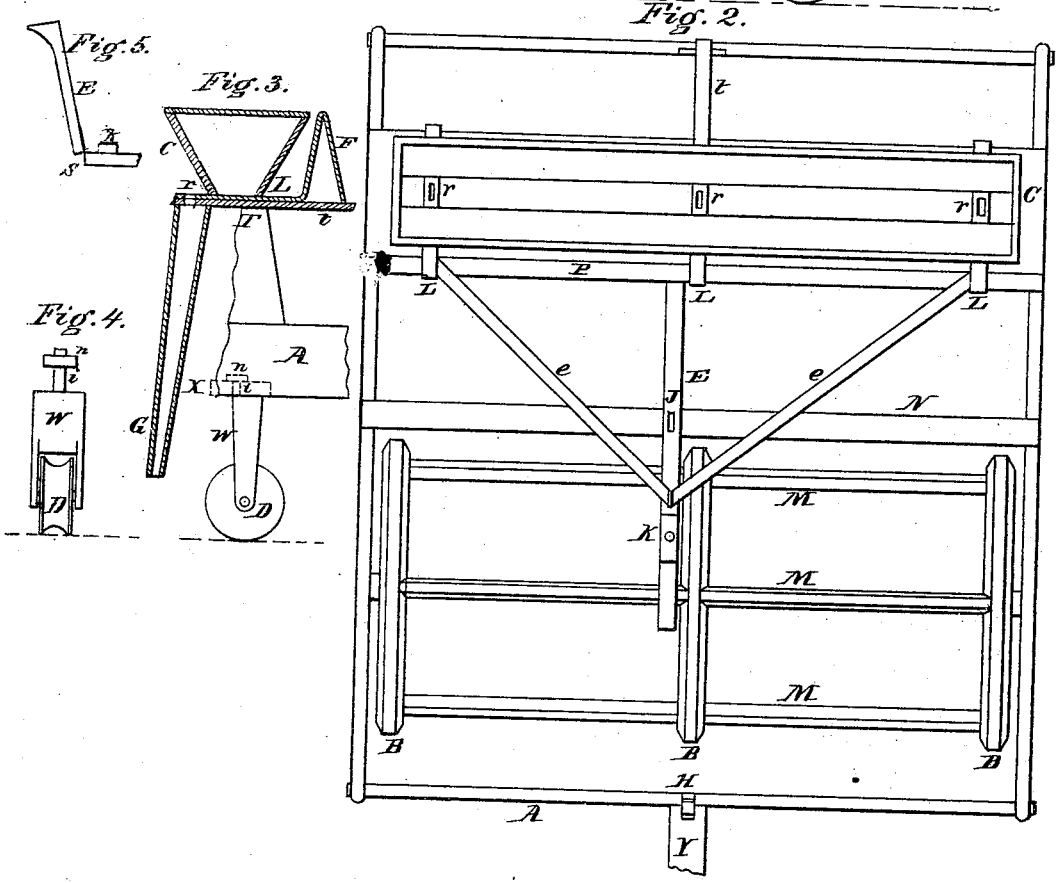
WITNESSES.
Eugene N. Bonfils
M. A. McLellan
INVENTOR.
Thomas C. Williams

T. C. WILLIAMS.

Improvement in Corn-Planters.

No. 129,446.

Patented July 16, 1872.

WITNESSES.
Eugene N. Bonfils.
M. A. McLellan.

INVENTOR.
Thomas C. Williams.

UNITED STATES PATENT OFFICE.

THOMAS C. WILLIAMS, OF WARRENTON, MISSOURI.

IMPROVEMENT IN CORN-PLANTERS.

Specification forming part of Letters Patent No. 129,446, dated July 16, 1872.

SPECIFICATION.

I, THOMAS C. WILLIAMS, of Warrenton, Warren county, State of Missouri, have invented a Horse Corn-Planter and Checker, of which the following is a specification:

Nature and Objects of the Invention.

My invention relates to the combination of wheels, bars, and dropper, and frame, in such manner that one set of wheels and bars shall mark and check the ground, and the dropper shall deposit the grain at the intersection of the marks, and another set of wheels shall cover the said grain. The grain being planted regularly both ways allows the farmer to run a plow or a cultivator both ways in attending to his crop.

Figure 1 is a side elevation of a machine embodying my invention. Fig. 2 is a plan view of a machine embodying my invention. Fig. 3 is a sectional view of my machine, showing a part of the dropping attachment and covering-wheel. Fig. 4 is a view of the covering-wheel, showing its concave surface. Fig. 5 is a view of the front end of the bar of the dropper attachment, showing the joint. Fig. 6 is a perspective view of a machine embodying my invention.

General Description.

A is a frame of my machine, which frame should be substantially constructed. B B B are wheels upon which the machine runs, and is supported in front, and which said wheels mark off the land. The fellies of these wheels are made narrower on the tire-edge than at the back part, as shown in Fig. 2, which permits them to make a deeper mark in the freshly-plowed land. M M M are bars securely fastened to the fellies, so that the sharp edge of each of them shall be even with the outside of the tire of the wheels B. Thus the wheels at each revolution check the ground into squares. C is the feed-box in which the seed to be planted is placed, and on top of which the driver sits. E J K L P F e e r r r t is the dropping attachment. L L L are slides with holes r r r, into which the grain drops from the feed-box C, and when they are drawn forward the grain falls into the spouts G G G, and is deposited in the intersection of the checks made by the wheels B and bars M immediately in front of, and is covered by, the wheels D D D, which said wheels have a broad concave tire, and are made of iron. P is a bar to which the slides L and the bars E and e e are attached. The bars e e are to stiffen the frame of the dropping attachment. The end of the bar E extends far enough to be immediately above the axle-tree of the wheels B, and the end thereof is made thicker and is sloped back from the end on the under side. When the wheels B revolve the bars M catch upon the projection on the end and lower side of the bar E and pull it forward far enough to permit the grain in the holes r to be discharged into the spouts G. The spring F is fastened securely to the frame t and to the end of the middle feed-bar L, and as soon as the end of the bar E slips from the cross-bar M said spring brings the feed-bars L back into the feed-box C. This arrangement makes the dropper entirely automatic in its action. The spring F may be made spiral, with the end thereof bearing against the back part of the feed-box C, and the bar L passing through it and secured at the end, and will thus have the same effect as the spring shown in the drawing. N is a frame on which the feed-bar rests, and also is for the driver to put his feet on. V is the tongue. T is a part of the frame to which the feed-box C is secured. S is a hinge-joint in the bar E. K is a button on the bar E. When on the road the button K is turned and the end of the bar E is raised, as shown in Fig. 5, and no grain is dropped. The bar E is straightened and the button K turned, and said bar is thus held stiff, and the dropping attachment is put into operation. X is a part of the frame A of the planter, and is attached to the lower edge of the side pieces, as shown by the dotted lines in Fig. 3. The wheels D are in a frame like that of bed-casters. The spindle i is on the front side of the top of the frame W, and passes through X, and is secured by the nut n, which is on the end of the spindle i. By being secured thus the wheels D may be turned in either direction as the planter is turned around, in the same manner as the casters on a bed are turned when the bed is moved about over the floor. J is a lever on the bar E by which it may be sprung up at the end over the cross-bars M, if it is desired to miss a row in planting or in turning the machine at the end of the rows. In turning at the end of the rows, the planter may not come round so as to drop the grain just in line with the other rows, whereupon the driver pulls the brake H over on the center wheel B, and stops said wheels from revolving until the machine is backed up or pulled forward far enough for the rows to come in line; then the brake H is thrown up, and may be used as a staff to guide the driver in keeping a straight line across the field. The grain being planted in straight rows both ways across the field, permits it being plowed or cultivated both ways.

I do not claim the wheels D, nor that part of the dropper which is like Hughes' planter, or any improvement thereon.

Claims.

I claim as my invention—

1. The combination of the wheels B and bars M, and the brake H, substantially as and for the purposes hereinbefore set forth.

2. The combination of the dropping attachment E F G J K L P, and the wheels D, and the joint S, and button K, substantially as and for the purposes hereinbefore set forth.

THOMAS C. WILLIAMS.

Witnesses:
  E. N. BONFILS,
  M. A. McLELLAN.